United States Patent
Syu et al.

(10) Patent No.: US 12,353,768 B2
(45) Date of Patent: Jul. 8, 2025

(54) MEMORY OPERATION METHOD INCLUDING PERFORMING TARGET CALCULATION IN MEMORY STORAGE DEVICE, MEMORY STORAGE DEVICE AND MEMORY CONTROL CIRCUIT UNIT

(71) Applicant: PHISON ELECTRONICS CORP., Miaoli (TW)

(72) Inventors: Jian Ping Syu, Taichung (TW); Wei Lin, Taipei (TW); Szu-Wei Chen, New Taipei (TW); An-Cin Li, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 20 days.

(21) Appl. No.: 18/504,107

(22) Filed: Nov. 7, 2023

(65) Prior Publication Data
US 2025/0123773 A1    Apr. 17, 2025

(30) Foreign Application Priority Data
Oct. 11, 2023    (TW) ................. 112138795

(51) Int. Cl.
G06F 3/06    (2006.01)

(52) U.S. Cl.
CPC .......... *G06F 3/0659* (2013.01); *G06F 3/0679* (2013.01); *G06F 3/0604* (2013.01)

(58) Field of Classification Search
CPC .... G06F 3/0659; G06F 3/0679; G06F 3/0604; G06F 3/061; G06F 3/0611; G06F 3/0613; G06F 3/0655; G06F 3/0658
See application file for complete search history.

(56) References Cited

U.S. PATENT DOCUMENTS

| | | |
|---|---|---|
| 2012/0151158 A1 | 6/2012 | Yeh |
| 2018/0218257 A1* | 8/2018 | Xu ........... G06F 9/4806 |
| 2019/0171450 A1* | 6/2019 | Werner ...... G06F 9/30043 |
| 2020/0185027 A1* | 6/2020 | Rom ............ G11C 11/54 |
| 2021/0034300 A1 | 2/2021 | Cho et al. |
| 2022/0188023 A1* | 6/2022 | Balasubramanian ........ G06F 3/0658 |
| 2023/0045840 A1* | 2/2023 | Chih ............ G11C 7/1096 |
| 2023/0065783 A1* | 3/2023 | Eilert ........... G06F 3/0655 |
| 2023/0267325 A1* | 8/2023 | Cho ............ G06N 3/04 706/15 |
| 2023/0305893 A1* | 9/2023 | Le Gallo-Bourdeau ...... G11C 7/1006 |
| 2024/0119055 A1* | 4/2024 | Sun ........... G06F 16/24569 |
| 2024/0202526 A1* | 6/2024 | Kim ............ G06N 3/0464 |
| 2025/0006232 A1* | 1/2025 | Papadopoulos ....... G06F 3/0688 |

* cited by examiner

*Primary Examiner* — Tracy A Warren
(74) *Attorney, Agent, or Firm* — JCIPRNET

(57) ABSTRACT

A memory operation method, a memory storage device, and a memory control circuit unit are disclosed. The memory operation includes following steps. First data is received from a host system. The first data is stored into a first physical unit which is mapped to a first logical unit. In a first operation mode, a target calculation is performed based on the first data and second data stored in a second physical unit to obtain third data, and the third data is different from the first data. The third data is stored into a third physical unit which is also mapped to the first logical unit. The third data is transmitted to the host system.

39 Claims, 13 Drawing Sheets

MEMORY OPERATION METHOD INCLUDING PERFORMING TARGET CALCULATION IN MEMORY STORAGE DEVICE, MEMORY STORAGE DEVICE AND MEMORY CONTROL CIRCUIT UNIT

CROSS-REFERENCE TO RELATED APPLICATION

This application claims the priority benefit of Taiwan application serial no. 112138795, filed on Oct. 11, 2023. The entirety of the above-mentioned patent application is hereby incorporated by reference herein and made a part of this specification.

BACKGROUND

Technical Field

The disclosure relates to a memory operation technology, and more particularly to a memory operation method, a memory storage device, and a memory control circuit unit.

Description of Related Art

In recent years, the market for portable electronic devices, such as mobile phones and notebook computers, has experienced significant growth. This surge in demand has been accompanied by an escalating need for storage media. Rewritable non-volatile memory modules, such as a flash memory, have emerged as good choices due to their non-volatile data storage, energy efficiency, compactness, and absence of mechanical components. These characteristics make the rewritable non-volatile memory modules a perfect fit for integration into various portable electronic devices, including those mentioned above. Besides, the adoption of artificial intelligence (AI) models (or AI chips) is on the rise, with their usage becoming increasingly pervasive, so as to offer a range of functionalities, such as image recognition, voice recognition, and so forth.

However, despite the continuous acceleration of computational speeds in the AI models, the practical computational performance of the AI models may be adversely impacted by the frequent necessity to pause for extensive data transmission between the AI models and the rewritable non-volatile memory modules during the computational process, which may result in an unfavorable user experience.

SUMMARY

The disclosure provides a memory operation method, a memory storage device, and a memory control circuit unit that are capable of enhancing computational performance of a host system.

An exemplary embodiment of the disclosure provides a memory operation method, which is applicable to a memory storage device, where the storage memory device includes a rewritable non-volatile memory module. The rewritable non-volatile memory module includes a plurality of physical units. The memory operation method includes following steps. First data is received from a host system. The first data is stored in a first physical unit of the physical units, where the first physical unit is mapped to a first logical unit. In a first operation mode, a target calculation is performed based on the first data and second data stored in a second physical unit of the physical units to obtain third data, where the third data is different from the first data. The third data is stored in a third physical unit of the physical units, where the third physical unit is also mapped to the first logical unit. The third data is transmitted to the host system.

An exemplary embodiment of the disclosure further provides a memory storage device that includes a connection interface unit, a rewritable non-volatile memory module, and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to: receive first data from the host system; store the first data in a first physical unit of the physical units, where the first physical unit is mapped to a first logical unit; in a first operation mode, perform a target calculation based on the first data and second data stored in a second physical unit of the physical units to obtain third data, where the third data is different from the first data; store the third data in a third physical unit of the physical units, where the third physical unit is mapped to the first logical unit; transmit the third data to the host system.

An exemplary embodiment of the disclosure further provides a memory control circuit unit that is configured to control a rewritable non-volatile memory module. The rewritable non-volatile memory module includes a plurality of physical units. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to: receive first data from the host system; store the first data in a first physical unit of the physical units, where the first physical unit is mapped to a first logical unit; in a first operation mode, perform a target calculation based on the first data and second data stored in a second physical unit of the physical units to obtain third data, where the third data is different from the first data; store the third data in a third physical unit of the physical units, where the third physical unit is mapped to the first logical unit; transmit the third data to the host system.

In view of the above, in the first operation mode of the memory storage device provided in one or more exemplary embodiments of the disclosure, the memory storage device may perform the target calculation based on the first data from the host system and the second data stored in the rewritable non-volatile memory module and transmit the third data generated by the calculation to the host system. As such, the computational performance of the host system may be enhanced.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
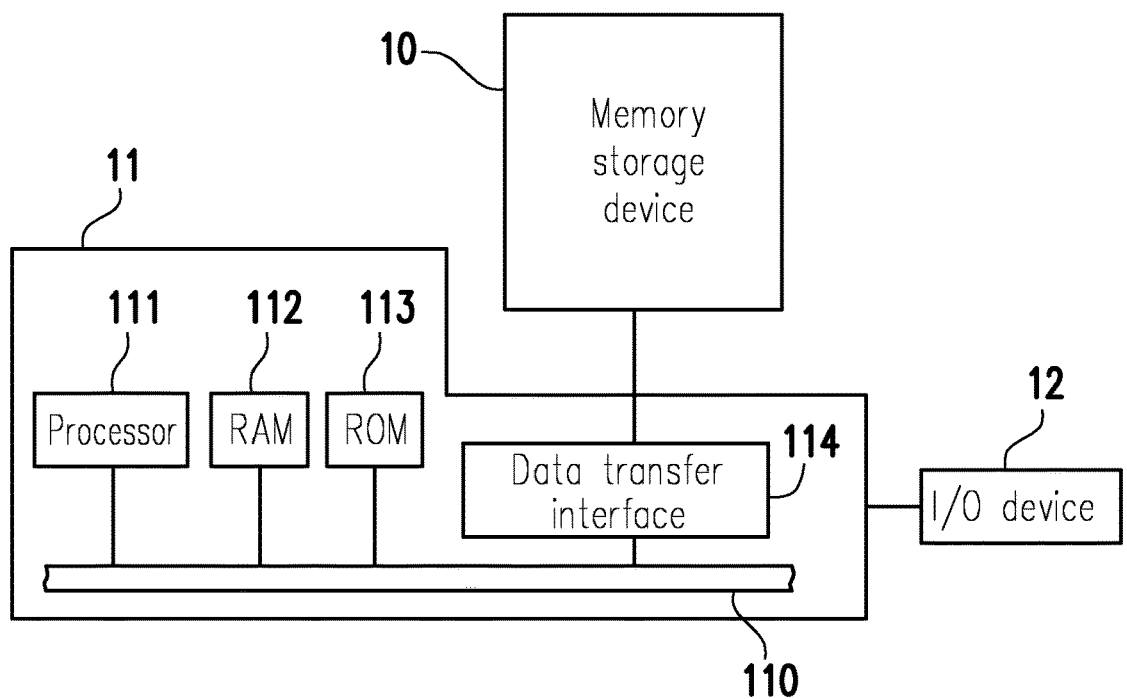
FIG. 1 is a schematic diagram of a host system, a memory storage device, and an input/output (I/O) device according to an exemplary embodiment of the disclosure.
Figure 2:
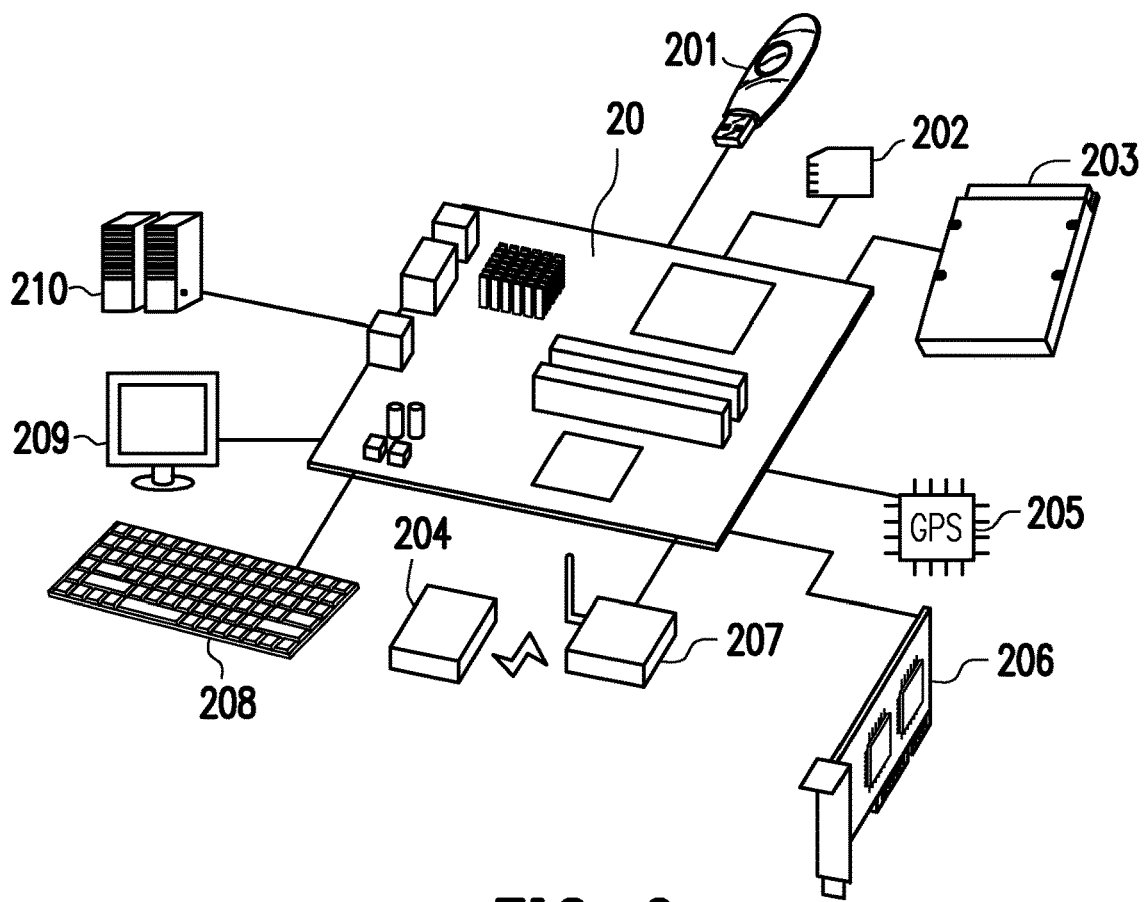
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For instance, the host system 11 may store data into the memory storage device 10 or read data from the memory storage device 10 via the data transmission interface 114. In addition, the host system 11 may be coupled to the I/O device 12 through the system bus 110. For instance, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, For instance, a flash drive 201, a memory card 202, a solid state drive (SSD) 203, or a wireless memory storage device 204. The wireless memory storage device 204 may be, For instance, a near field communication (NFC) memory storage device, a Wi-Fi memory storage device, a Bluetooth memory storage device, a low-power Bluetooth memory storage device (For instance, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For instance, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
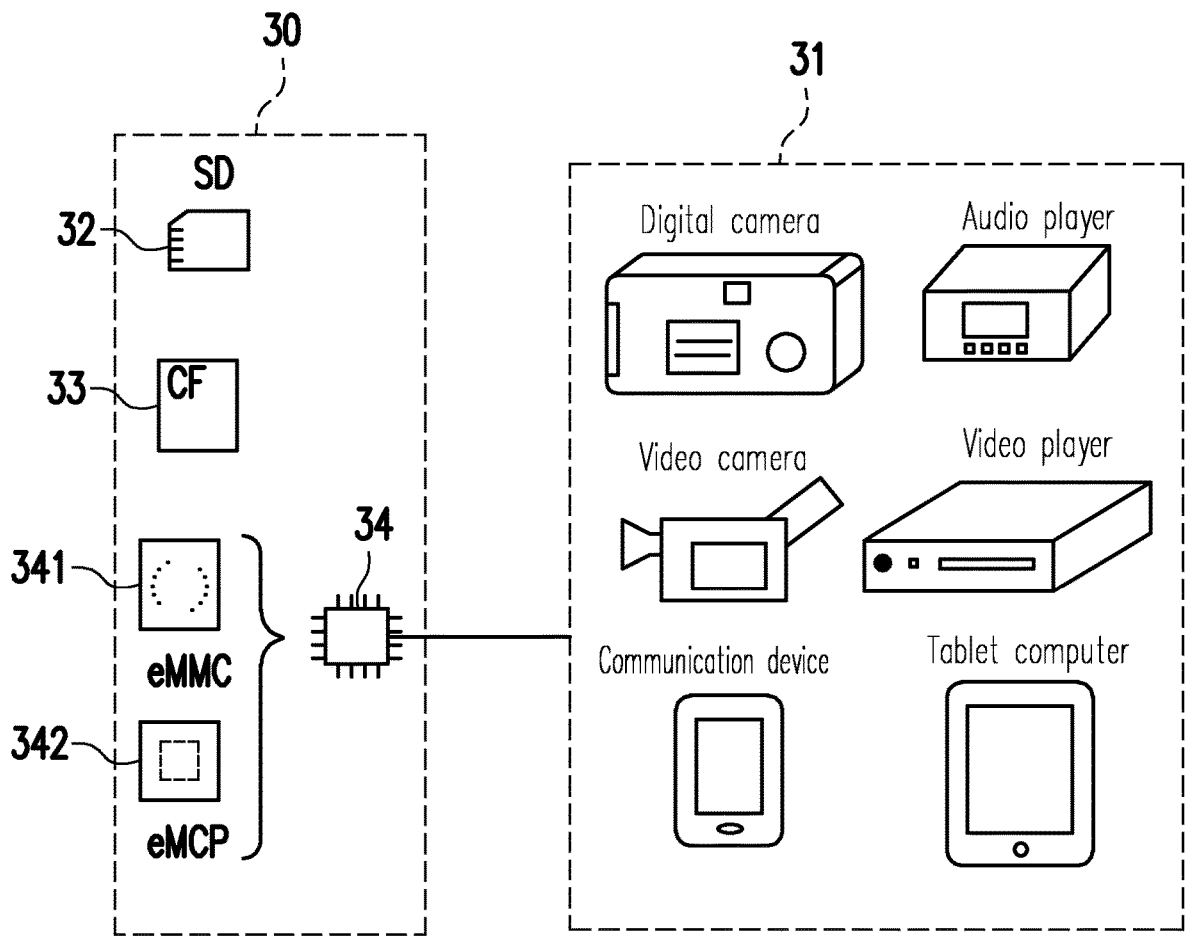
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For instance, the host system 31 may be a digital camera, a video camera, a communication device, an audio player, a video player, a tablet computer, or other systems. For instance, the memory storage device 30 may be a secure digital (SD) card 32, a compact flash (CF) card 33, an embedded storage device 34, or various other non-volatile memory storage devices used by the host system 31. The embedded storage device 34 includes an embedded multimedia card (eMMC) 341, an embedded multi-chip package (eMCP) storage device 342, and/or various other embedded storage devices in which a memory module is directly coupled onto a substrate of a host system.

Figure 4:
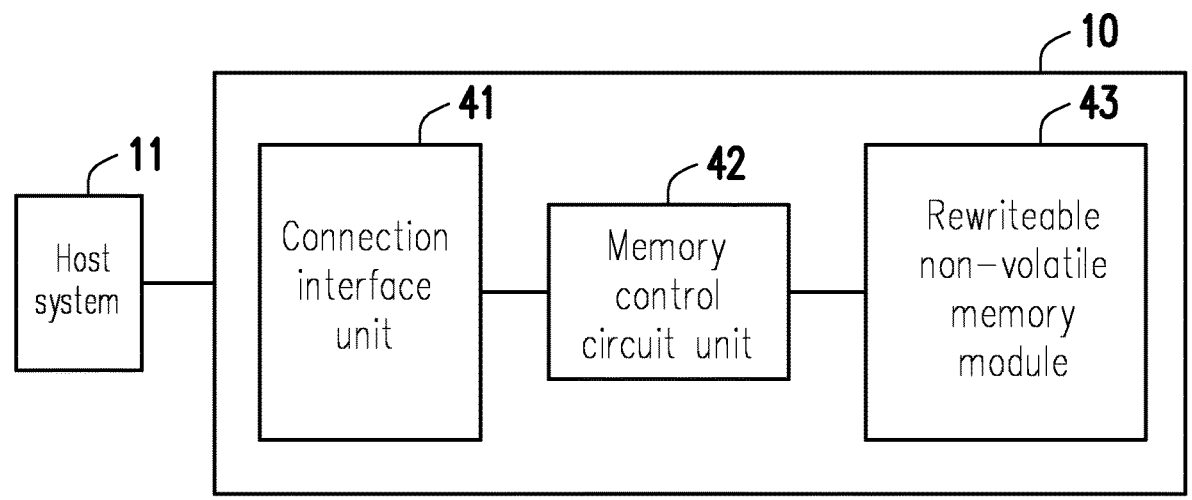
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For instance, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For instance, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (For instance, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For instance, the physical erasing unit is a physical block.

Figure 5:
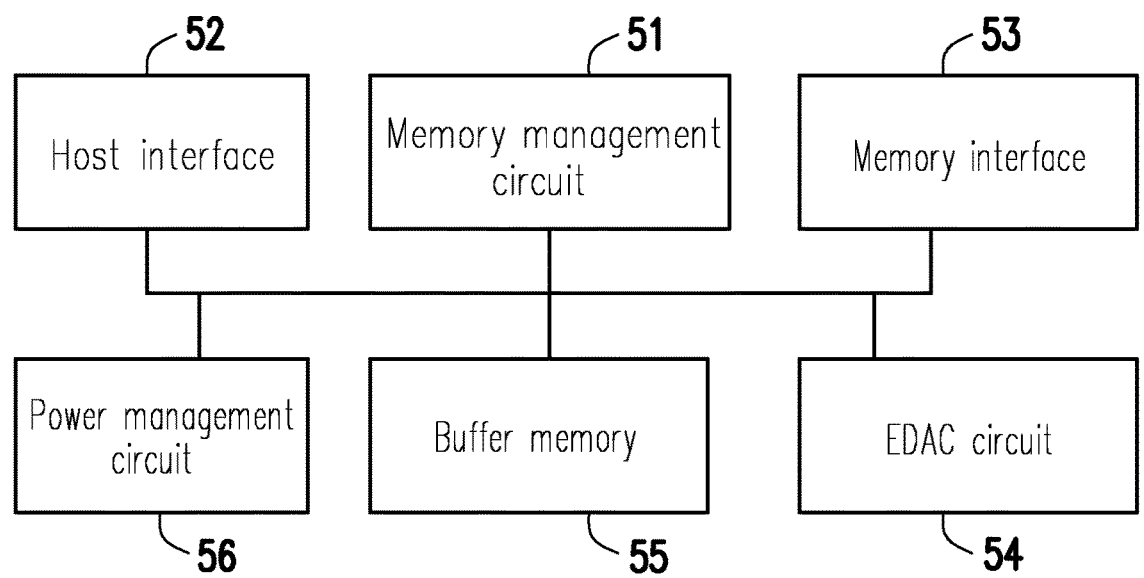
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53. The memory management circuit 51 is used to control the overall operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For instance, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In an exemplary embodiment, the control commands of the memory management circuit 51 may also be stored into a specific region (For instance, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For instance, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be used to receive and identify commands and data sent by the host system 11. For instance, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For instance, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For instance, the command sequences may include the write command sequence instructing to write data, the read command sequence instructing to read data, the erase command sequence instructing to erase data, and corresponding command sequences instructing various memory operations, e.g., changing a read voltage level, performing a garbage collection (GC) operation, and so on. The command sequences are, for instance, generated by the memory management circuit 51 and sent to the rewritable non-volatile memory module 43 through the memory interface 53. The command sequences may include one or more signals, or data on a bus. The signals or the data may include command codes or program codes. For instance, the read command sequence includes information such as a read recognition code and a memory address.

In an exemplary embodiment, the memory control circuit unit 42 further includes an error detecting and correcting (EDAC) circuit 54, a buffer memory 55, and a power management circuit 56.

The error detecting and correcting circuit 54 is coupled to the memory management circuit 51 and is used to perform error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 will perform error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
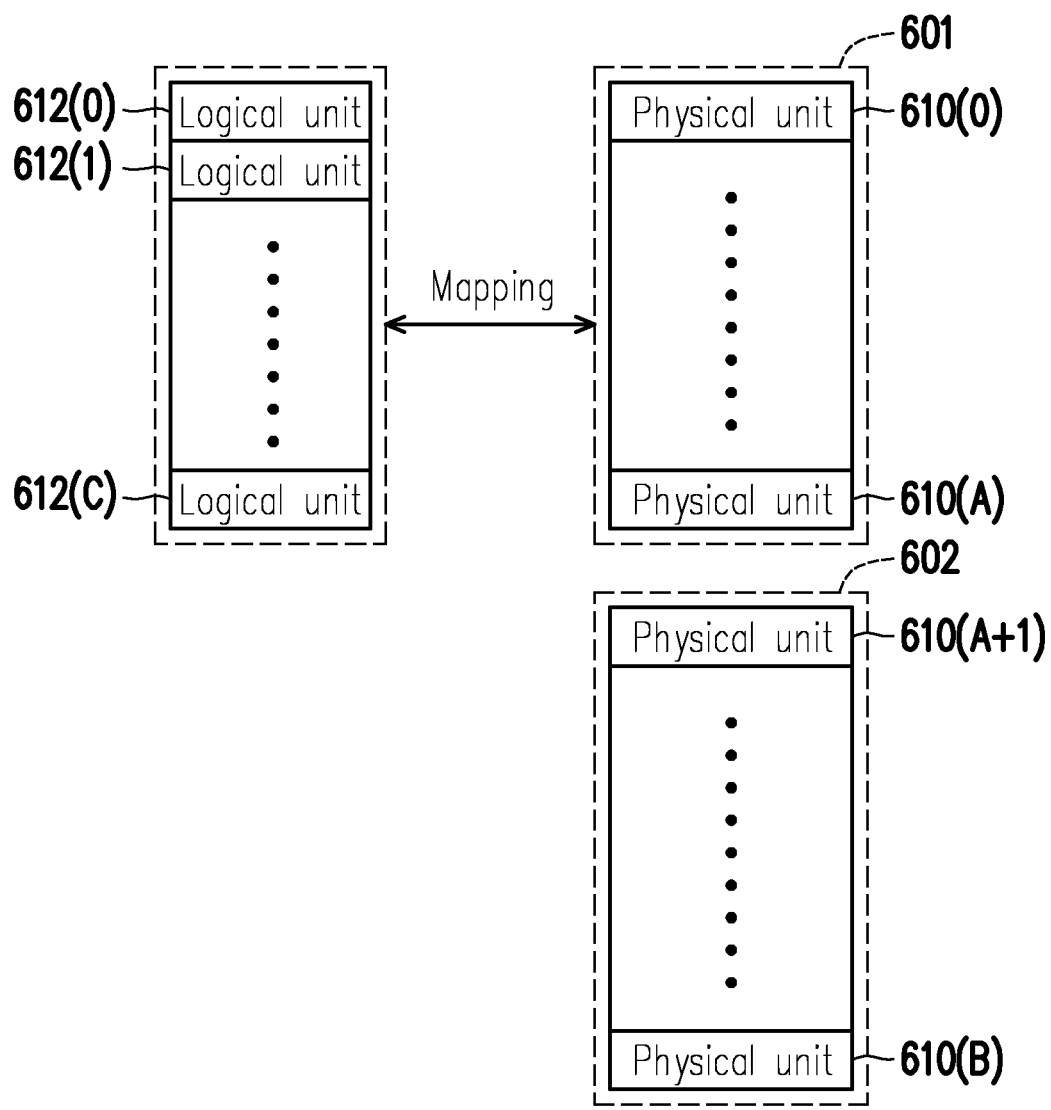
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602. In an exemplary embodiment, one physical unit refers to one physical address or one physical programming unit. In an exemplary embodiment, one physical unit may also refer to a combination of a plurality of continuous or discontinuous physical addresses. In an exemplary embodiment, one physical unit may also refer to a virtual block (VB), and the VB may include a plurality of physical addresses or a plurality of physical programming units. In an exemplary embodiment of the disclosure, one VB may include one or more physical erasing units.

The physical units 610(0) to 610(A) in the storage area 601 are used to store user data (For instance, the user data from the host system 11 of FIG. 1). For instance, the physical units 610(0) to 610(A) in the storage area 601 may store valid data and invalid data. The physical units 610(A+1) to 610(B) in the spare area 602 do not store data (For instance, valid data). For instance, if a certain physical unit does not store valid data, the physical unit may be associated (or added) to the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For instance, one logical address may include one or more logical block addresses (LBA) or other logical management units. In an exemplary embodiment, one logical unit may also correspond to one logical programming unit or consist of multiple continuous or non-continuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

Figure 7:
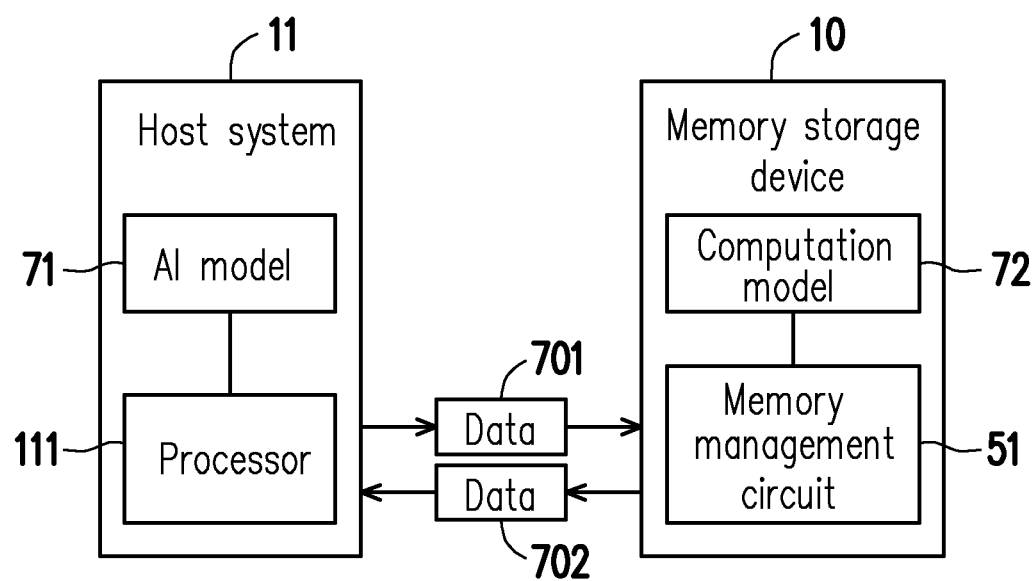
FIG. 7 is a schematic diagram illustrating data exchange between a host system and a memory storage device according to an exemplary embodiment of the disclosure.

FIG. 7 is a schematic diagram illustrating data exchange between a host system and a memory storage device according to an exemplary embodiment of the disclosure. Please refer to FIG. 7. In an exemplary embodiment, a host system 11 may run one or more artificial intelligence (AI) models 71. For instance, the AI model 71 may be run by a processor 111 of the host system 11. For instance, the processor 111 may include a central processing unit (CPU), a graphics processing unit (GPU), or any other programmable general-purpose or special-purpose microprocessor, digital signal processor (DSP), programmable controller, application specific integrated circuit (ASIC), programmable logic device (PLD), or any other similar device or a combination of the above. In the following exemplary embodiments, operations performed by the host system 11 may be considered as being performed solely by the processor 111 or by the processor 111 together with other electronic circuits in the host system 11.

In an exemplary embodiment, the AI model 71 may include a machine learning model, a deep learning model, and/or other computer computation engines. The AI model may adopt artificial neural networks (ANN) or neural network architectures, such as deep neural networks (DNN), recurrent neural networks (RNN), and/or convolutional neural networks (CNN). The processor 111 may perform various automated functions, such as image recognition, voice recognition, or natural language processing (NLP) through the AI model 71, and the automated functions supported by the AI model 71 are not limited to what are described above. In addition, the AI model 71 may be implemented as software, hardware, and/or firmware, which should however not be construed as a limitation in the disclosure.

In an exemplary embodiment, the memory management circuit 51 may receive data (also referred to as first data) 701 from the host system 11 through the host interface 52. The data 701 belongs to a specific logical unit (also referred to as a first logical unit). For instance, the first logical unit may include one of the logical units 612(0)-612(C) in FIG. 6. The memory management circuit 51 may store the data 701 in a specific physical unit (also referred to as a first physical unit) in the rewritable non-volatile memory module 43. For instance, the first physical unit may be one of the physical units 610(A+1)-610(B) in FIG. 6. The first physical unit is mapped to the first logical unit.

In an exemplary embodiment, in a specific operation mode (also referred to a first operation mode) of the memory storage device 10, the memory management circuit 51 may perform a calculation (also referred to as a target calculation) based on the data 701 and data (also referred to as second data) stored in a specific physical unit (also referred to as a second physical unit) in the rewritable non-volatile memory module 43 to obtain data (also referred to as the third data) 702. The data 702 is different from the data 701. That is, the content of the data 702 is different from the content of the data 701. Then, the memory management circuit 51 may store the data 702 in a specific physical unit (also referred to as a third physical unit) in the rewritable non-volatile memory module 43. For instance, the third physical unit may be another one of the physical units 610(A+1)-610(B) in FIG. 6. The third physical unit is also mapped to the first logical unit. Additionally, after obtaining the data 703, the memory management circuit 51 may transmit the data 703 to the host system 11 through the host interface 52.

In an exemplary embodiment, the target calculation is configured to support the AI model 71 in the host system 11 to update data. For instance, such data update includes updating parameters including weights or vector function values adopted by the AI model 71 during the calculation process. FIG. 7 is taken as an example, and in the target calculation, the memory management circuit 51 may update specific data (also referred to as target data) to the third data (e.g., the data 702) based on the first data (e.g., the data 701) and the second data.

In an exemplary embodiment, the memory management circuit 51 may perform the target calculation through a calculation model 72. The calculation model 72 is installed in the memory storage device 10. For instance, the memory management circuit 51 may run the calculation model 72 to update the target data to the third data (e.g., the data 702) based on the first data (e.g., the data 701) and the second data. In addition, the calculation model 72 may be implemented as software, hardware, and/or firmware, which should however not be construed as a limitation in the disclosure.

In an exemplary embodiment, the calculation model 72 may be configured to replace one or more calculation models originally set in the host system 11 (or the AI model 71) and configured to perform the target calculation. In an exemplary embodiment, installing the calculation model 72 into the memory storage device 10 to perform the target calculation is equivalent to migrating at least one target calculation, which is originally handled by the host system 11 (or the AI model 71), to the memory storage device 10 and having the memory storage device 10 perform the target calculation. As such, the amount of data transmitted between the host system 11 and the memory storage device 10 may be reduced while the AI model 71 is in process of updating data.

Conventionally, during the data updating process performed by the AI model 71, the host system 11 reads a significant amount of data required for computation (including the second data) from the memory storage device 10, which leads to a decrease in the actual computational performance of the AI model 71 (affected by the bandwidth of data transmission). Therefore, regardless of how fast the computational speed of the AI model 71 or the processor 111 is, the actual computational performance of the AI model 71 may decrease due to waiting for the large amount of the data transmitted between the host system 11 and the memory storage device 10, thereby reducing the computational performance of the host system 11 (or the AI model 71) and/or affecting the user experience.

In an exemplary embodiment, by transmitting a small portion of data (e.g., the data 701) to be processed through the target calculation to the memory storage device 10 and receiving a calculation result of the target calculation (e.g., the data 702) from the memory storage device 10, the host system 11 may at least not perform the operation of reading the second data from the memory storage device 10 (i.e., skipping the operation of reading the second data from the memory storage device 10). As such, the amount of data transmitted between the host system 11 and the memory storage device 10 during the data updating process performed by the AI model 71 may be effectively reduced, thereby making the actual computational performance of the AI model 71 closer to its optimal or preset computational performance.

Figure 8A:
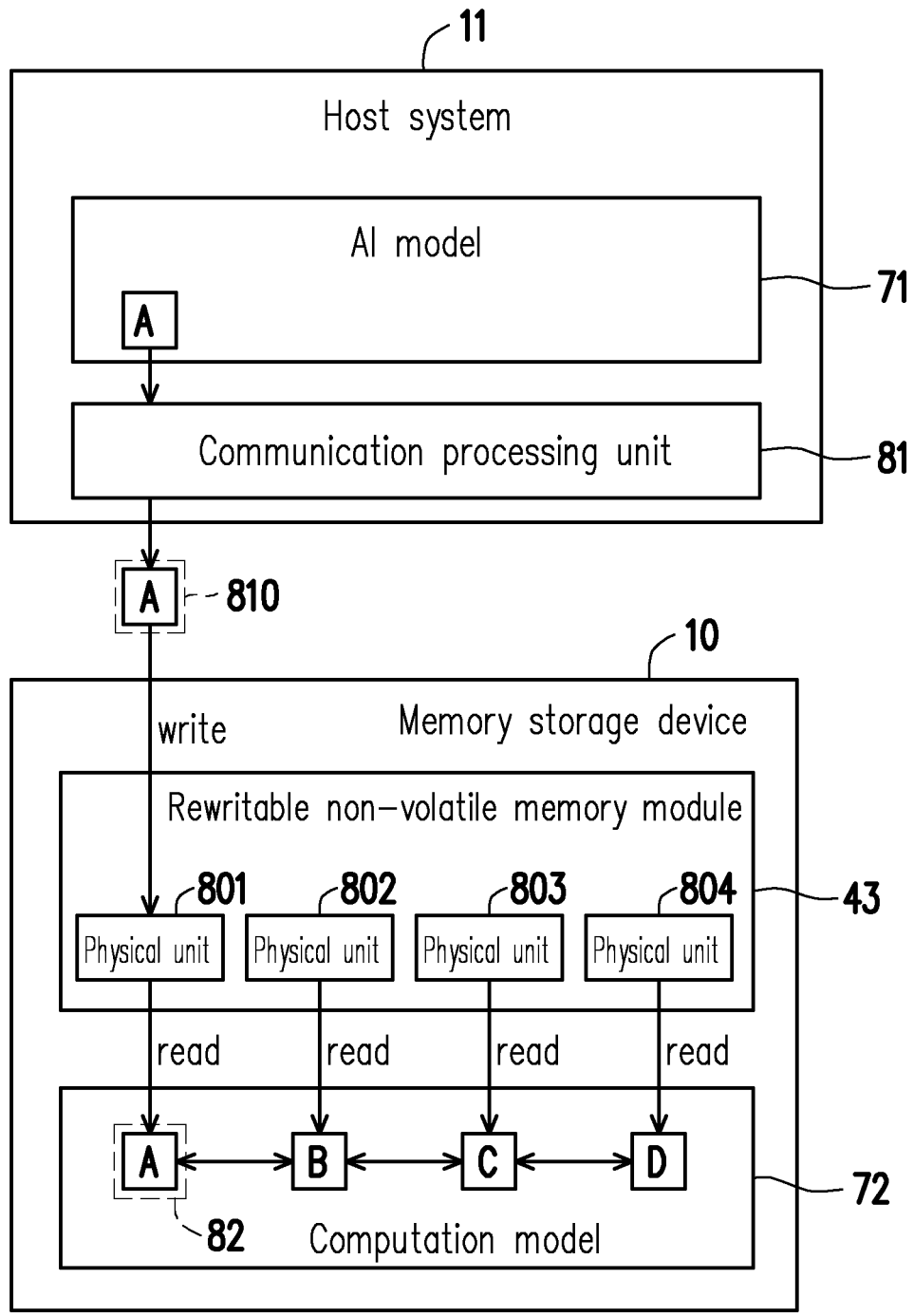
FIG. 8A and FIG. 8B are schematic diagrams illustrating a memory storage device performing a target calculation and exchanging data with a host system according to an exemplary embodiment of the disclosure.
Figure 8B:
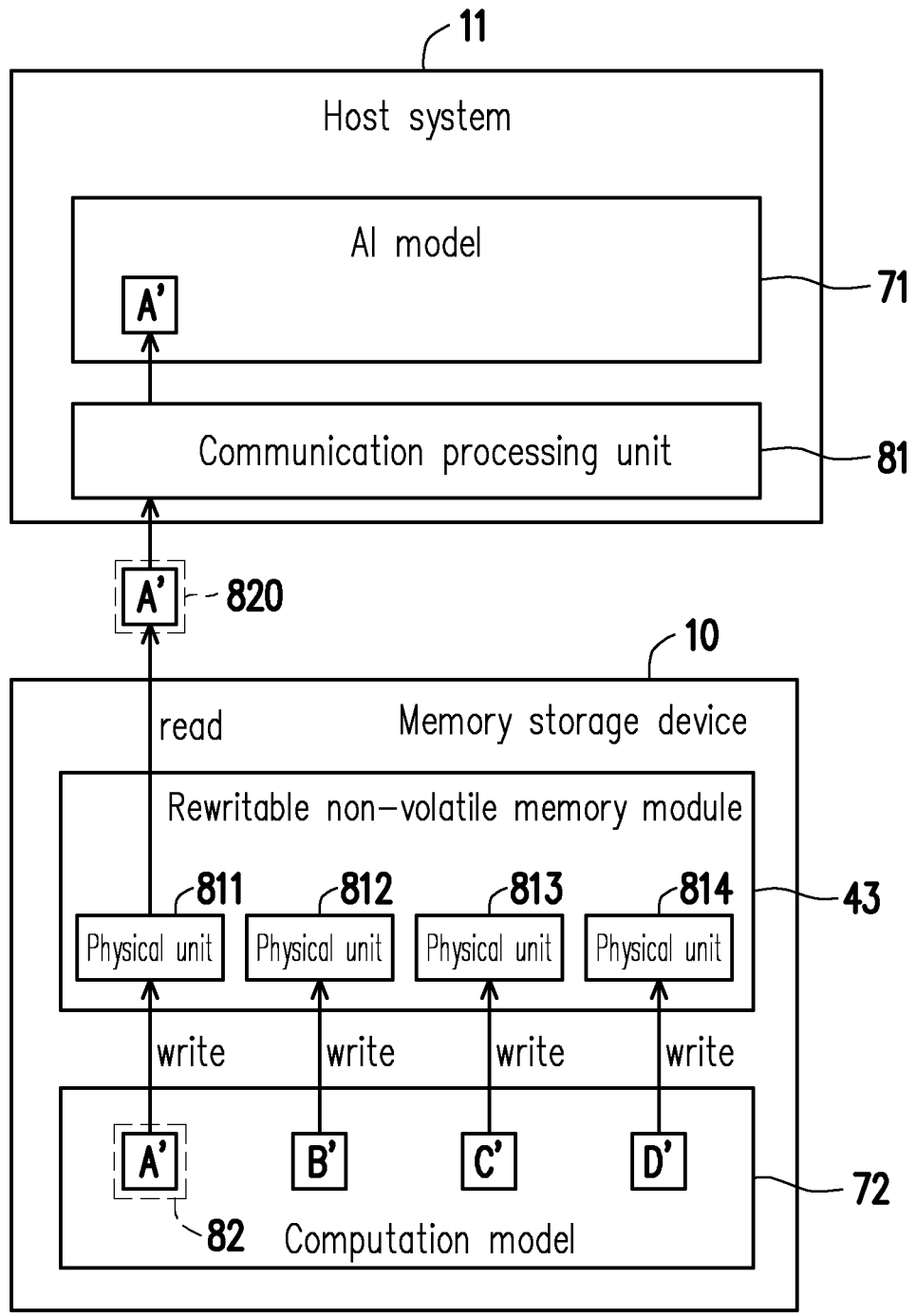

FIG. 8A and FIG. 8B are schematic diagrams illustrating a memory storage device performing a target calculation and exchanging data with a host system according to an exemplary embodiment of the disclosure. Please refer to FIG. 8A. It is assumed that a communication processing unit 81 is further installed in the host system 11. For instance, the communication processing unit 81 may include a driver or an application program. The communication processing unit 81 may be configured to exchange data related to the target calculation between the host system 11 and the memory storage device 10.

In an exemplary embodiment, the communication processing unit 81 may transmit data 810 (i.e., the first data) to the memory storage device 10. For instance, the data 810 includes data A provided by the AI model 71. The data A belongs to the first logical unit. The memory management circuit 51 may receive the data 810 from the host system 11 via the host interface 52 and store the data A in a physical unit 801 (i.e., the first physical unit) of the rewritable non-volatile memory module 43.

In a first operation mode, the memory management circuit 51 may read the data A from the physical unit 801 and read data B-D (i.e., the second data) from physical units 802-804 (i.e., the second physical units) of the rewritable non-volatile memory module 43, respectively. Then, the memory management circuit 51 may run the calculation model 72 to perform the target calculation based on the data A (i.e., the first data) and the data B-D (i.e., the second data) to obtain data A' (i.e., the third data) shown in FIG. 8B. For instance, in the target calculation, the memory management circuit 51 may update data 82 (i.e., target data) from the data A to the data A' via the calculation model 72. Moreover, in the target calculation, the memory management circuit 51 may, based on the data A-D, also update the data B-D to data B'-D' shown in FIG. 8B.

Please refer to FIG. 8B following FIG. 8A. In an exemplary embodiment, after the data A' (i.e., the third data) is generated, the memory management circuit 51 may store the data A' in a physical unit 811 (i.e., the third physical unit) of the rewritable non-volatile memory module 43 and store the data B'-D' in the physical units 812-814 of the rewritable non-volatile memory module 43, respectively. Then, the memory management circuit 51 may read the data A' from the physical unit 811 and transmit data 820 containing the data A' to the host system 11. On the other hand, after the data 820 is received, the communication processing unit 81 may provide the data A' in the data 820 to the AI model 71, so as to allow the AI model 71 to update the corresponding data.

In an exemplary embodiment, after the third data is transmitted to the host system 11, the memory management circuit 51 may receive another data (also referred to as the fourth data) from the host system 11. The memory management circuit 51 may store the fourth data in a specific physical unit (also referred to as a fourth physical unit) of the rewritable non-volatile memory module 43. For instance, the fourth physical unit may be one of the physical units 610(A+1)-610(B) shown in FIG. 6. The fourth physical unit is also mapped to the first logical unit. After that, in the first operation mode, the memory management circuit 51 may perform a target calculation based on the fourth data and the third data stored in the third physical unit to further update the target data to another data (also referred to as fifth data). For instance, during the target calculation, the memory management circuit 51 may update the target data to the fifth data based on the fourth data, the previously generated third data, and at least part of the second data. The memory management circuit 51 may then transmit the fifth data to the host system 11.

FIG. 9A to FIG. 9D are schematic diagrams illustrating a memory storage device performing a target calculation and exchanging data with a host system according to an exemplary embodiment of the disclosure. Please refer to FIG. 9A. In an exemplary embodiment, the communication processing unit 81 in the host system 11 may transmit data 910 (i.e., the first data) to the memory storage device 10. For instance, the data 910 includes the data A and B provided by the AI model 71. Both of the data A and B belong to the first logical unit. The memory management circuit 51 may receive the data 910 from the host system 11 via the host interface 52 and store the data A and B in physical units 901 and 902 (i.e., the first physical units) of the rewritable non-volatile memory module 43, respectively.

In a first operation mode, the memory management circuit 51 may read the data A and B from the physical units 901 and 902, respectively. In addition, the memory management circuit 51 may read data C and D (i.e., the second data) from physical units 903 and 904 (i.e., the second physical units) of the rewritable non-volatile memory module 43, respectively. After that, the memory management circuit 51 may run the calculation model 72 to perform the target calculation based on the data A and B (i.e., the first data) and the data C and D (i.e., the second data) to obtain the data A' (i.e., the third data) shown in FIG. 9B. For instance, during the target calculation, the memory management circuit 51 may update the data 82 (i.e., the target data) from the data A to the data A' through running the calculation model 72. Moreover, during the target calculation, the memory management circuit 51 may also update the data B-D to the data B'-D' shown in FIG. 9B based on the data A-D.

Figure 9A:
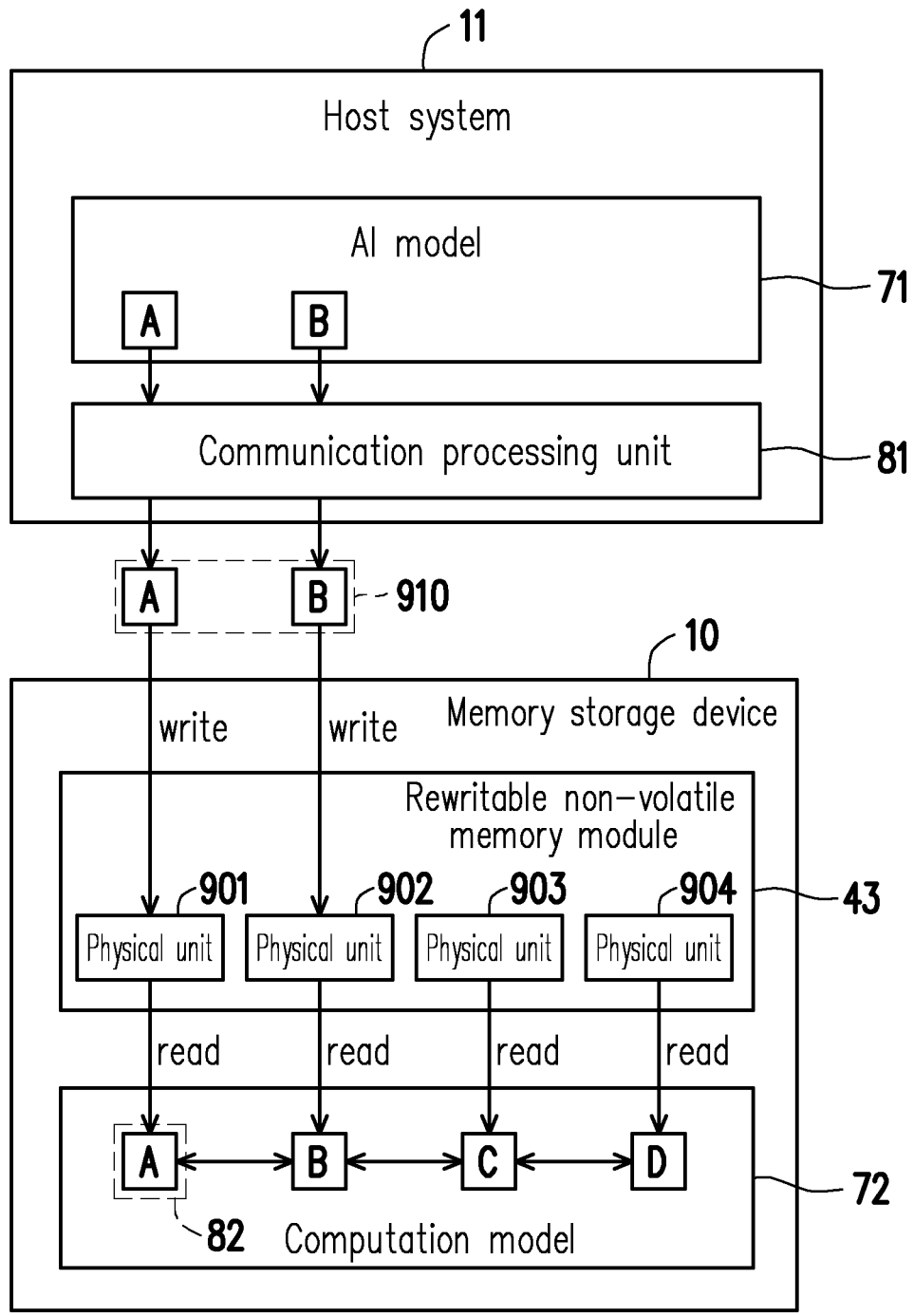
FIG. 9A to FIG. 9D are schematic diagrams illustrating a memory storage device performing a target calculation and exchanging data with a host system according to an exemplary embodiment of the disclosure.
Figure 9B:
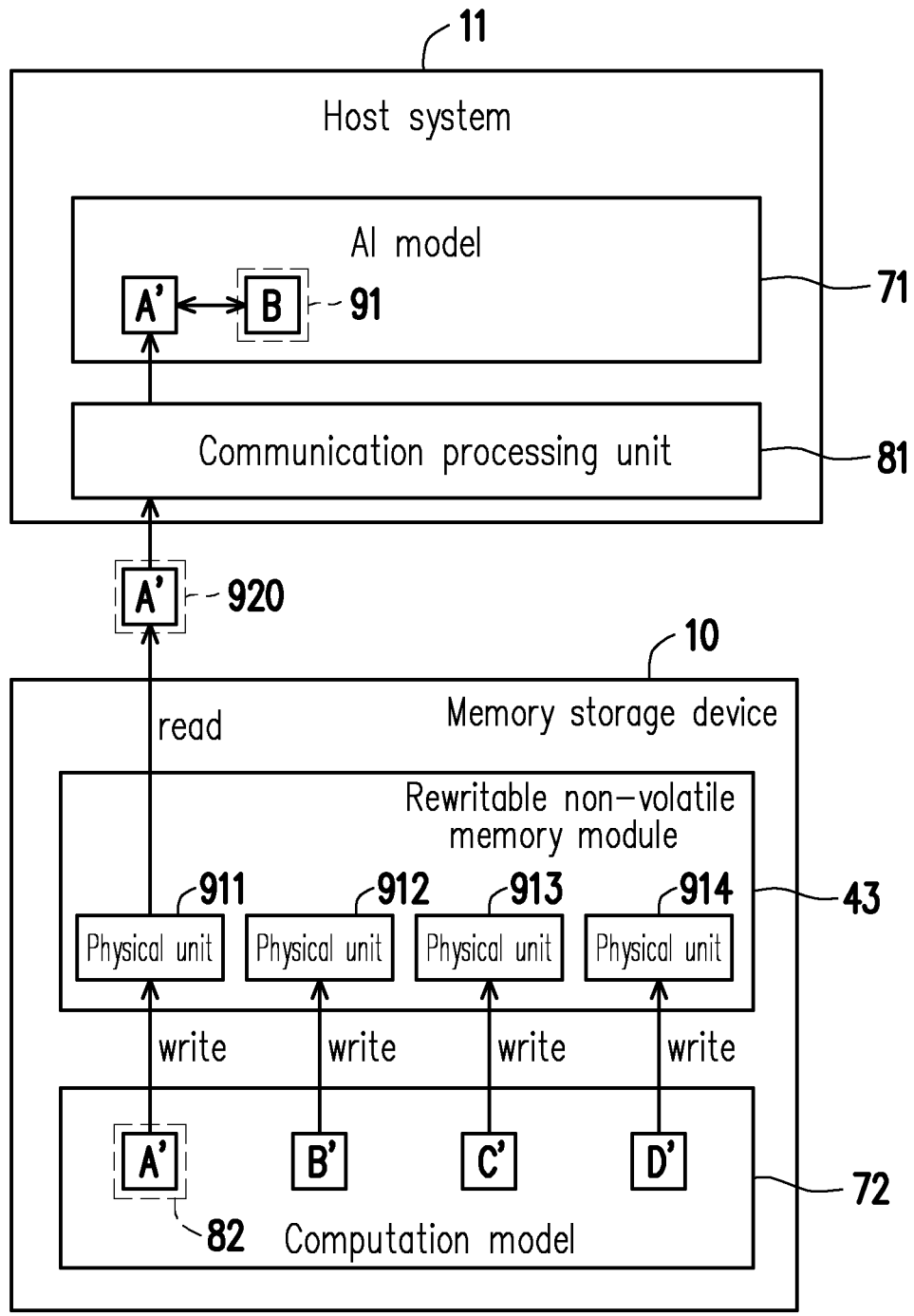

Please refer to FIG. 9B following FIG. 9A. In an exemplary embodiment, after generating the data A' (i.e., the third data), the memory management circuit 51 may store the data A' in the physical unit 911 (i.e., the third physical unit) of the rewritable non-volatile memory module 43 and store the data B'-D' in physical units 912-914 of the rewritable non-volatile memory module 43, respectively. After that, the memory management circuit 51 may read the data A' from the physical unit 911 and transmit the data 920 containing the data A' to the host system 11.

On the other hand, after the data 920 is received, the communication processing unit 81 may provide the data A' in the data 920 to the AI model 71, so as to allow the AI model 71 to update the corresponding data. For instance, after the AI model 71 obtains the data A', the AI model 71 may update data 91 based on the data A'. For instance, the data 91 includes the data B. The AI model 71 may update the data 91 from the data B to data E shown in FIG. 9C based on the data A'.

Figure 9C:
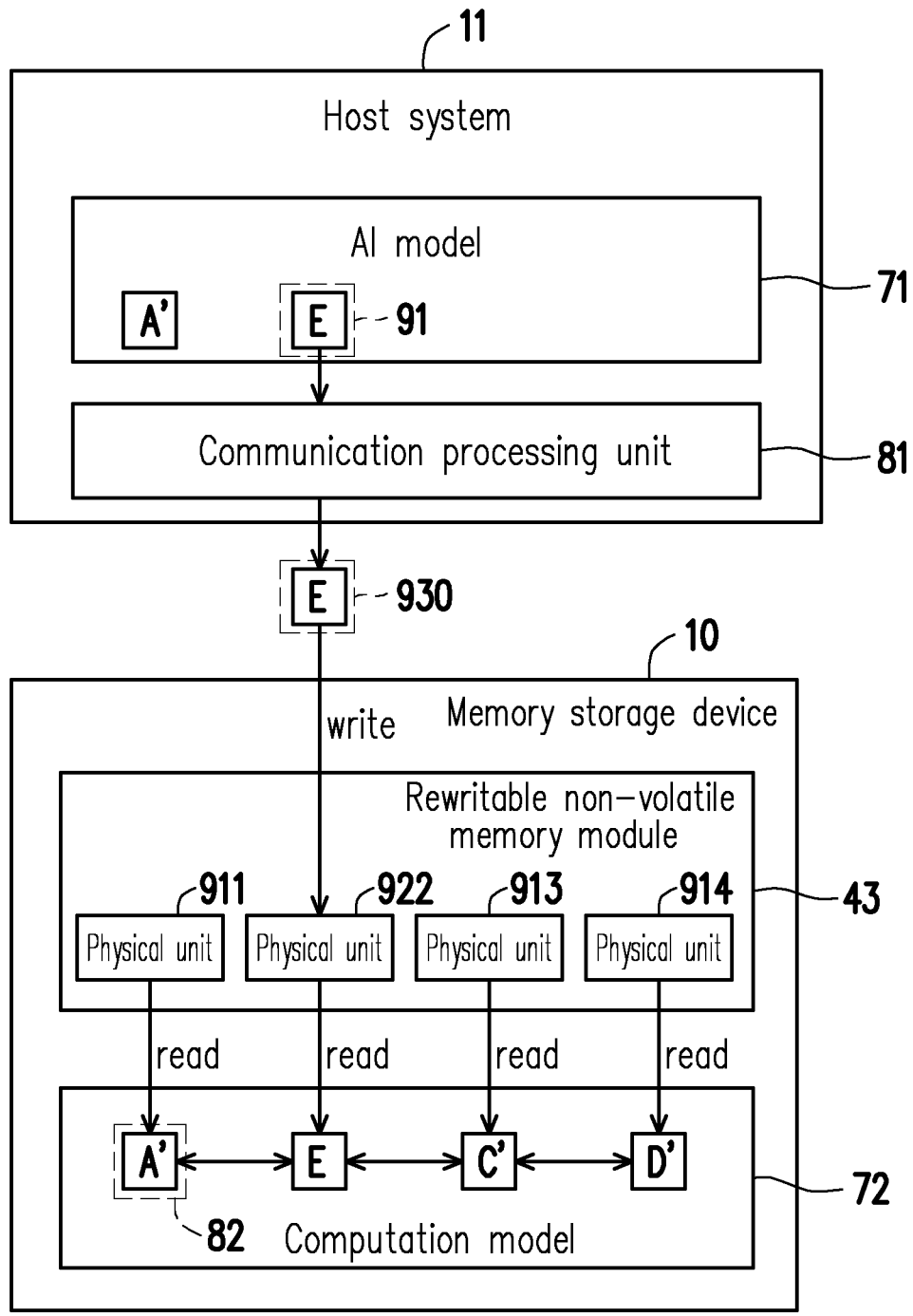

Please refer to FIG. 9C following FIG. 9B. In an exemplary embodiment, after the data E is obtained, the communication processing unit 81 may transmit data 930 (i.e., the fourth data) to the memory storage device 10. For instance, the data 930 includes the data E provided by the AI model 71. The data E also belongs to the first logical unit. The memory management circuit 51 may receive the data 930 from the host system 11 via the host interface 52 and store the data E in the physical unit 922 (i.e., the fourth physical unit) of the rewritable non-volatile memory module 43.

In the first operation mode, the memory management circuit 51 may read the data A', data E, the data C', and the data D' from the physical units 911, 922, 913, and 914, respectively. After that, the memory management circuit 51 may run the calculation model 72 to perform the target calculation based on the data A', E, C', and D' to obtain data A" (i.e., the fifth data) shown in FIG. 9D. For instance, in the target calculation, the memory management circuit 51 may update the data 82 (i.e., the target data) from the data A' to the data A" through running the calculation model 72. Moreover, during the target calculation, the memory management circuit 51 may also update the data E, C', and D' to data E', C", and D" based on the data A', E, C', and D', respectively.

Figure 9D:
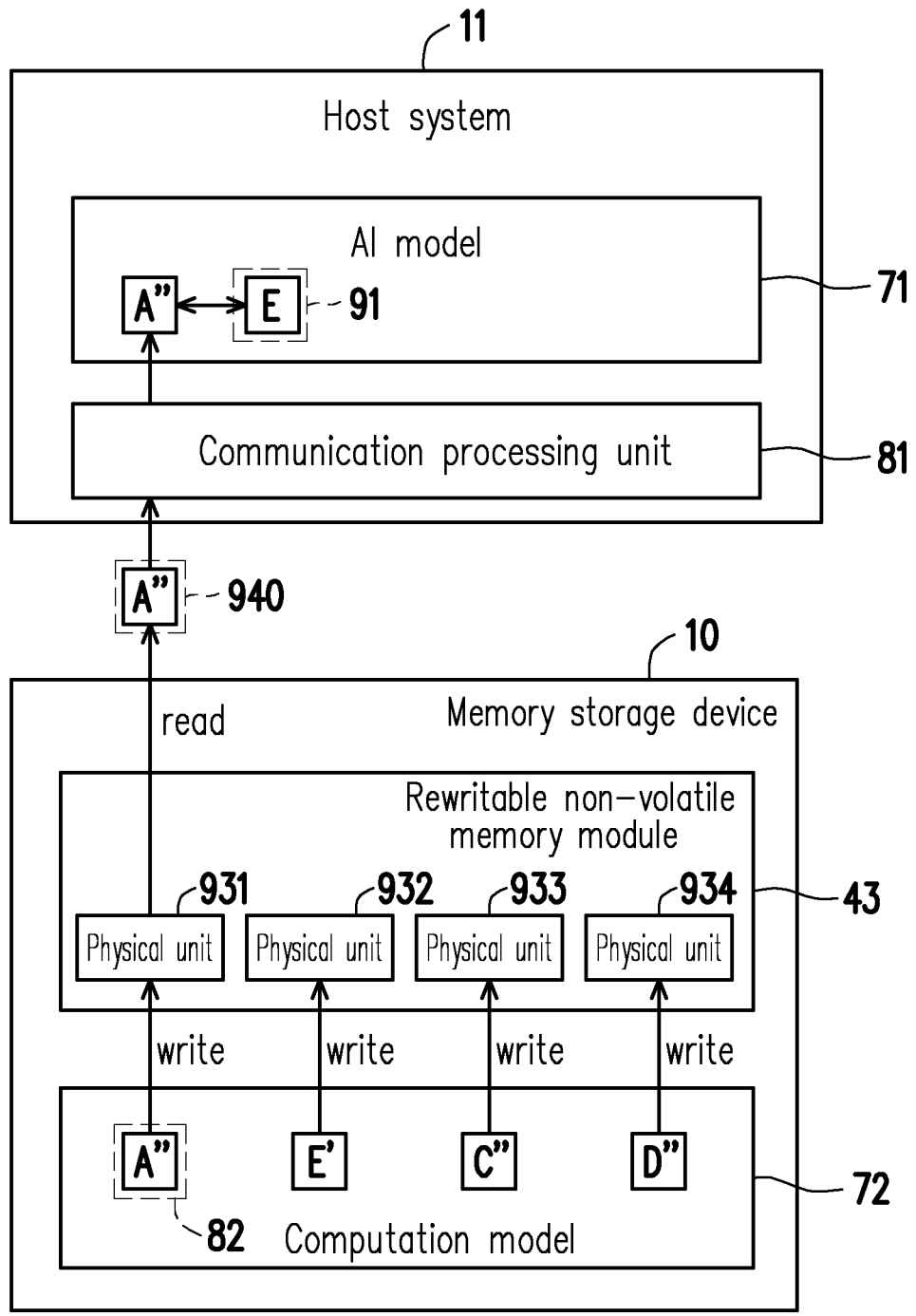

Please refer to FIG. 9D following FIG. 9C. In an exemplary embodiment, after the data A" (i.e., the fifth data) is generated, the memory management circuit 51 may store the data A", E', C", and D" into physical units 931-934 of the rewritable non-volatile memory module 43, respectively. After that, the memory management circuit 51 may read the data A" from the physical unit 931 and transmit data 940 containing the data A" to the host system 11.

After the data 940 is received, the communication processing unit 81 may provide the data A" in the data 940 to the AI model 71, so as to allow the AI model 71 to update the corresponding data. For instance, after the AI model 71 obtains the data A", the AI model 71 may update the data 91 again based on the data A", e.g., updating the data 91 from the data E to another data, which will not be further described hereinafter.

In an exemplary embodiment, by migrating the calculation model 72 configured to perform the target calculation into the memory storage device 10 and transmitting part of the data (e.g., the data 810 and 820 in FIG. 8A and FIG. 8B and/or the data 910-940 in FIG. 9A to FIG. 9D) required for data update by the AI model 71 only between the host system 11 and the memory storage device 10, the amount of data transmitted between the host system 11 and the memory storage device 10 during the data update by the AI model 71 may be effectively reduced. As a result, the computational performance of the host system 11 (or the AI model 71) may be effectively improved.

In an exemplary embodiment, the memory management circuit 51 may record a plurality of mapping information in a plurality of management tables, respectively. For instance, first mapping information is recorded in a first management table, and second mapping information is recorded in a second management table. The first mapping information may reflect a mapping relationship between the first logical unit and the first physical unit. The second mapping information may reflect a mapping relationship between the first logical unit and the second physical unit. In a first operation mode, the memory management circuit 51 may read or store data associated with the target calculation based on the management tables.

Figure 10:
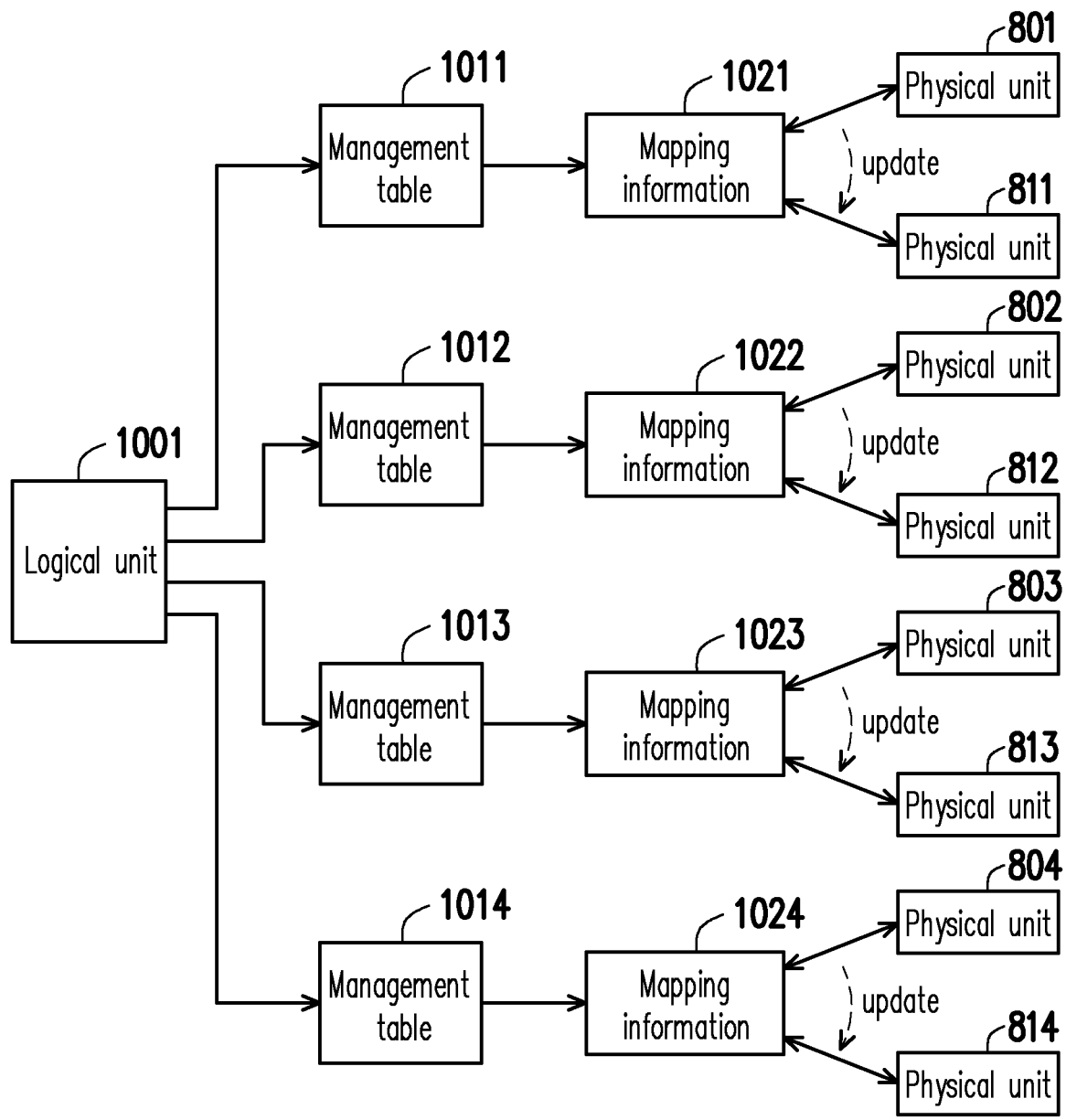
FIG. 10 is a schematic diagram illustrating the recording and updating of mapping information according to an exemplary embodiment of the disclosure.

FIG. 10 is a schematic diagram illustrating the recording and updating of mapping information according to an exemplary embodiment of the disclosure. Please refer to FIG. 8A, FIG. 8B, and FIG. 10. In an exemplary embodiment, it is assumed that at least part of the data required for performing the target calculation belongs to a logical unit 1001 (i.e., the first logical unit). The memory management circuit 51 may look up management tables 1011-1014 through the logical unit 1001 to obtain mapping information 1021-1024, respectively. Different management tables may be applied to manage different calculation stages or functions.

For instance, with reference to FIG. 8A, the mapping information 1021-1024 may respectively reflect a mapping relationship between the logical unit 1001 and the physical units 801-804. The memory management circuit 51 may look up the management tables 1011-1014 through the logical unit 1001 to obtain the mapping information 1021-1024, respectively. Based on the mapping information 1021-1024, the memory management circuit 51 may read the data A-D from the physical units 801-804, respectively. For instance, the data A-D all belong to the logical unit 1001.

For instance, with reference to FIG. 8B, in response to storing the data A'-D' to the physical units 811-814, respectively, the memory management circuit 51 may update the mapping information 1021-1024. For instance, the updated mapping information 1021-1024 may respectively reflect the mapping relationship between the logical unit 1001 and the physical units 811-814. In addition, the updated mapping information 1021-1024 may be re-recorded in the management tables 1011-1014.

It should be noted that in the exemplary embodiment shown in FIG. 10, the logical unit 1001 is mapped to the physical units 801-804 (or the physical units 811-814) as an example. However, in another exemplary embodiment, the logical unit 1001 may be mapped to the physical unit 801 (or the physical unit 811), and at least one logical unit (also referred to as the second logical unit) may be mapped to the physical units 802-804 (or the physical units 812-814). The first logical unit is different from the second logical unit. For instance, the second logical unit may include another one of the logical units 612(0)-612(C) shown in FIG. 6, and there may be an association (e.g., the mapping relationship) between the first logical unit and the second logical unit.

FIG. 10 is taken as an example, and in an exemplary embodiment, the mapping information 1021 may respectively reflect the mapping relationship between the first logical unit (i.e., the logical unit 1001) and the physical unit 801 (or the physical unit 811), while the mapping information 1022-1024 may respectively reflect the mapping relationship between one or more second logical units and physical units 802-804 (or 812-814). Before looking up the management tables 1012-1014, the memory management circuit 51 may ascertain the second logical unit based on the first logical unit and the association between the first logical unit and the second logical unit. After that, the memory management circuit 51 may look up the management tables 1012-1014 through the second logical unit to obtain the mapping information 1022-1024. Similar operations may also be performed according to the exemplary embodiments depicted in in FIG. 9A-FIG. 9D and thus will not be further described hereinafter.

In an exemplary embodiment shown in FIG. 8B, before the target calculation (i.e., writing the data A' into the physical unit 811) is completed, the memory management circuit 51 may disallow to read the physical unit 811 (i.e., the third physical unit) to avoid incorrect data A' (i.e., the third data) from being read. Relevant operations may also be performed according to the exemplary embodiments shown in FIG. 9A-FIG. 9D and thus will not be further described hereinafter.

In an exemplary embodiment, the memory management circuit 51 may receive a request (also referred to as an activation request) from the host system 11 via the host interface 52. The memory management circuit 51 may activate the first operation mode based on the activation request. Subsequently, in the first operation mode, the memory management circuit 51 may perform the target calculation to obtain the third data. However, in an exemplary embodiment, the memory management circuit 51 may not activate the first operation mode if the activation request is not received. Besides, in an exemplary embodiment, after one or more target calculations are completed, the memory management circuit 51 may exit or turn off the first operation mode. In an exemplary embodiment, if the first operation mode is not activated, the memory management circuit 51 may not perform the target calculation.

In an exemplary embodiment, after the first data is received, the memory management circuit 51 may determine whether to activate the first operation mode based on the logical unit (i.e., the first logical unit) to which the first data belongs. For instance, the memory management circuit 51 may determine whether the first logical unit to which the first data belongs is within a specific logical range. In response to the first logical unit being within the specific logical range, the memory management circuit 51 may activate the first operation mode. However, if the first logical unit is not within the specific logical range, the memory management circuit 51 may not activate the first operation mode.

In an exemplary embodiment, the memory management circuit 51 may receive a write command from the host system 11 via the host interface 52. The write command may be configured to write the first data to the first logical unit. For instance, the write command may carry the first data and the first logical unit to which the first data belongs. In the first operation mode, the memory management circuit 51 may perform operations related to the target calculation based on the first data and the first logical unit to generate the third data. The details of the related operations have been described in detail above and thus will not be further provided hereinafter.

In an exemplary embodiment, after the write command is received, the memory management circuit 51 may receive a read command from the host system 11 via the host interface 52. The read command is configured to read the first logical unit. Therefore, after the third data is obtained, the memory management circuit 51 may, based on the read command, transmit the third data to the host system 11 via the host interface 52 in response to the read command.

In an exemplary embodiment, before the target calculation is performed, the memory management circuit 51 may perform a handshake operation with the host system 11. During the handshake operation, the memory management circuit 51 may perform initialization settings associated with the target calculation. For instance, during the handshake operation, the memory management circuit 51 may perform initialization operations, such as activating the first operation mode and/or activating the computation model 72.

In an exemplary embodiment, during the handshake operation, the memory management circuit 51 may receive an inquiry command from the host system 11. The inquiry command may be configured to ascertain the ability of the memory storage device 10 to support computation for the AI model 71. For instance, this inquiry command may be configured to inquire whether the memory storage device 10 supports the ability of the computation for the AI model 71, the type of algorithm adopted in the computation for AI model 71 supported by the memory storage device 10, and/or the resources (such as the required memory space) needed by the memory storage device 10 to support the computation for the AI model 71. After the inquiry command is received, during the handshake operation, the memory management circuit 51 may send a reply message to the host system 11. The reply message may be configured to explain the ability of the memory storage device 10 to support the computation for the AI model 71. For instance, the reply message may be configured to reply the host system 11 regarding whether the memory storage device 10 supports the computation for the AI model 71, the type of algorithm adopted in the computation for the AI model 71 supported by the memory storage device 10, and/or the resources (such as the required memory space) needed by the memory storage device 10 to support the computation for the AI model 71. In addition, more information related to the target calculation may be also exchanged with the host system 11 during the handshake operation, which should however not be construed as a limitation in the disclosure.

Figure 11:
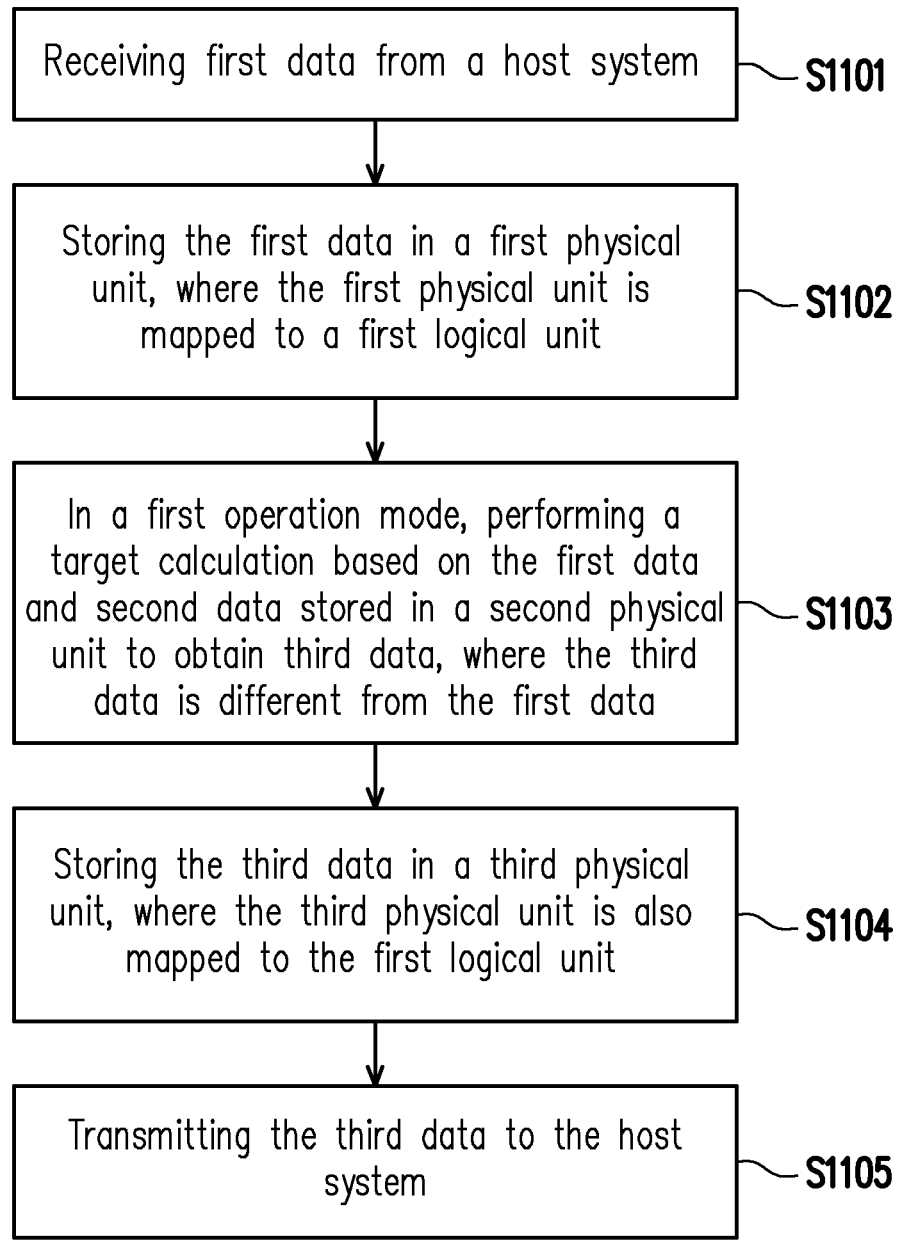
FIG. 11 is a flowchart illustrating a memory operation method according to an exemplary embodiment of the disclosure.

FIG. 11 is a flowchart illustrating a memory operation method according to an exemplary embodiment of the disclosure. With reference to FIG. 11, in step S1101, first data is received from a host system. In step S1102, the first data is stored in a first physical unit, where the first physical unit is mapped to a first logical unit. In step S1103, in a first operation mode, a target calculation is performed based on the first data and second data stored in a second physical unit to obtain third data, where the third data is different from the first data. In step S1104, the third data is stored in a third physical unit, where the third physical unit is also mapped to the first logical unit. In step S1105, the third data is transmitted to the host system.

However, the details of each step in FIG. 11 have been elaborated above and thus will not be further described hereinafter. It is worth noting that the steps in FIG. 11 may be implemented in form of a plurality of programming codes or circuits, which should however not be construed as a limitation in the disclosure. In addition, the method depicted in FIG. 11 may be applied in conjunction with the above exemplary embodiments or applied independently, which should also not be construed as a limitation in the disclosure.

To sum up, in one or more of the exemplary embodiments proposed in the disclosure, the target calculation, which is preset to be handled by the host system (or the AI model), is migrated to the memory storage device and executed by the memory storage device. As such, the amount of the data transmitted between the host system and the memory storage device may be reduced while the AI model is in process of updating data, thereby improving the computational performance of the host system (or the AI model).

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory operation method adapted to a memory storage device, wherein the memory storage device comprises a rewritable non-volatile memory module, the rewritable non-volatile memory module comprises a plurality of physical units, and the memory operation method comprises:
receiving an activation request from a host system;
activating a first operation mode based on the activation request;
receiving first data from the host system;
storing the first data in a first physical unit of the plurality of physical units, wherein the first physical unit is mapped to a first logical unit;
in the first operation mode, performing a target calculation based on the first data and second data stored in a second physical unit of the plurality of physical units to obtain third data, wherein the third data is different from the first data;
storing the third data in a third physical unit of the plurality of physical units, wherein the third physical unit is mapped to the first logical unit; and
transmitting the third data to the host system.

2. The memory operation method as claimed in claim 1, wherein the step of performing the target calculation based on the first data and the second data stored in the second physical unit of the plurality of physical units to obtain the third data comprises:
during the target calculation, updating target data to the third data based on the first data and the second data.

3. The memory operation method as claimed in claim 2, further comprising:
receiving fourth data from the host system; and
in the first operation mode, performing the target calculation based on the fourth data and the third data stored in the third physical unit to update the target data to fifth data.

4. The memory operation method as claimed in claim 1, wherein the second physical unit is mapped to the first logical unit.

5. The memory operation method as claimed in claim 1, wherein the second physical unit is mapped to a second logical unit, the first logical unit is different from the second logical unit, and the first logical unit and the second logical unit are associated with each other.

6. The memory operation method as claimed in claim 1, further comprising:
recording first mapping information in a first mapping table, wherein the first mapping information reflects a mapping relationship between the first logical unit and the first physical unit; and
recording second mapping information in a second mapping table, wherein the second mapping information reflects a mapping relationship between the first logical unit and the second physical unit, and the first mapping table is different from the second mapping table.

7. The memory operation method as claimed in claim 6, further comprising:
in response to the third data stored in the third physical unit, updating the first mapping information recorded in the first mapping table, wherein the updated first mapping information reflects a mapping relationship between the first logical unit and the third physical unit.

8. The memory operation method as claimed in claim 1, further comprising:
disallowing to read the third physical unit before completing the target calculation to obtain the third data.

9. The memory operation method as claimed in claim 1, further comprising:
determining whether to activate the first operation mode based on the first logical unit to which the first data belongs.

10. The memory operation method as claimed in claim 1, wherein the target calculation is configured to support an artificial intelligence model in the host system to update data.

11. The memory operation method as claimed in claim 1, further comprising:
receiving a write command from the host system, wherein the write command is configured to write the first data into the first logical unit;
receiving a read command from the host system, wherein the read command is configured to read the first logical unit; and
transmitting the third data to the host system in response to the read command.

12. The memory operation method as claimed in claim 1, further comprising:
performing a handshake operation with the host system before performing the target calculation; and
performing initialization settings associated with the target calculation during the handshake operation.

13. The memory operation method as claimed in claim 12, wherein the handshake operation comprises:
receiving an inquiry command from the host system, wherein the inquiry command is configured to ascertain an ability of the memory storage device to support computation for an artificial intelligence model; and
sending a reply message to the host system, wherein the reply message is configured to explain the ability of the memory storage device to support the computation for the artificial intelligence model.

14. A memory storage device, comprising:
a connection interface unit, configured to couple to a host system;
a rewritable non-volatile memory module, comprising a plurality of physical units; and
a memory control circuit unit, coupled to the connection interface unit and the rewritable non-volatile memory module,
wherein the memory control circuit unit is configured to:
receive an activation request from the host system;
activate a first operation mode based on the activation request;
receive first data from the host system;
store the first data in a first physical unit of the plurality of physical units, wherein the first physical unit is mapped to a first logical unit;
in the first operation mode, perform a target calculation based on the first data and second data stored in a second physical unit of the plurality of physical units to obtain third data, wherein the third data is different from the first data;
store the third data in a third physical unit of the plurality of physical units, wherein the third physical unit is mapped to the first logical unit; and
transmit the third data to the host system.

15. The memory storage device as claimed in claim 14, wherein the operation of performing the target calculation based on the first data and the second data stored in the second physical unit of the plurality of physical units to obtain the third data by the memory control circuit comprises:
during the target calculation, updating target data to the third data based on the first data and the second data.

16. The memory storage device as claimed in claim 15, wherein the memory control circuit unit is further configured to:
  receive fourth data from the host system; and
  in the first operation mode, perform the target calculation based on the fourth data and the third data stored in the third physical unit to update the target data to fifth data.

17. The memory storage device as claimed in claim 14, wherein the second physical unit is mapped to the first logical unit.

18. The memory storage device as claimed in claim 14, wherein the second physical unit is mapped to a second logical unit, the first logical unit is different from the second logical unit, and the first logical unit and the second logical unit are associated with each other.

19. The memory storage device as claimed in claim 14, wherein the memory control circuit unit is further configured to:
  record first mapping information in a first mapping table, wherein the first mapping information reflects a mapping relationship between the first logical unit and the first physical unit; and
  record second mapping information in a second mapping table, wherein the second mapping information reflects a mapping relationship between the first logical unit and the second physical unit, and the first mapping table is different from the second mapping table.

20. The memory storage device as claimed in claim 19, wherein the memory control circuit unit is further configured to:
  in response to the third data stored in the third physical unit, updating the first mapping information recorded in the first mapping table, wherein the updated first mapping information reflects a mapping relationship between the first logical unit and the third physical unit.

21. The memory storage device as claimed in claim 14, wherein the memory control circuit unit is further configured to:
  disallow to read the third physical unit before the target calculation is completed to obtain the third data.

22. The memory storage device as claimed in claim 14, wherein the memory control circuit unit is further configured to:
  determine whether to activate the first operation mode based on the first logical unit to which the first data belongs.

23. The memory storage device as claimed in claim 14, wherein the target calculation is configured to support an artificial intelligence model in the host system to update data.

24. The memory storage device as claimed in claim 14, wherein the memory control circuit unit is further configured to:
  receive a write command from the host system, wherein the write command is configured to write the first data into the first logical unit;
  receive a read command from the host system, wherein the read command is configured to read the first logical unit; and
  transmit the third data to the host system in response to the read command.

25. The memory storage device as claimed in claim 14, wherein the memory control circuit unit is further configured to:
  perform a handshake operation with the host system before performing the target calculation; and
  perform initialization settings associated with the target calculation during the handshake operation.

26. The memory storage device as claimed in claim 25, wherein the handshake operation comprises:
  receive an inquiry command from the host system, wherein the inquiry command is configured to ascertain an ability of the memory storage device to support computation for an artificial intelligence model; and
  send a reply message to the host system, wherein the reply message is configured to explain the ability of the memory storage device to support the computation for the artificial intelligence model.

27. A memory control circuit unit, adapted to control a rewritable non-volatile memory module, wherein the rewritable non-volatile memory module comprises a plurality of physical units, and the memory control circuit unit comprises:
  a host interface, configured to couple to a host system;
  a memory interface, configured to couple to the rewritable non-volatile memory module; and
  a memory management circuit, coupled to the host interface and the memory interface,
  wherein the memory management circuit is configured to:
  receive an activation request from the host system;
  activate a first operation mode based on the activation request;
  receive first data from the host system;
  store the first data in a first physical unit of the plurality of physical units, wherein the first physical unit is mapped to a first logical unit;
  in the first operation mode, perform a target calculation based on the first data and second data stored in a second physical unit of the plurality of physical units to obtain third data, wherein the third data is different from the first data;
  store the third data in a third physical unit of the plurality of physical units, wherein the third physical unit is mapped to the first logical unit; and
  transmit the third data to the host system.

28. The memory control circuit unit as claimed in claim 27, wherein the operation of performing the target calculation based on the first data and the second data stored in the second physical unit of the plurality of physical units to obtain the third data by the memory management circuit comprises:
  during the target calculation, updating target data to the third data based on the first data and the second data.

29. The memory control circuit unit as claimed in claim 28, wherein the memory management circuit is further configured to:
  receive fourth data from the host system; and
  in the first operation mode, perform the target calculation based on the fourth data and the third data stored in the third physical unit to update the target data to fifth data.

30. The memory control circuit unit as claimed in claim 27, wherein the second physical unit is mapped to the first logical unit.

31. The memory control circuit unit as claimed in claim 27, wherein the second physical unit is mapped to a second logical unit, the first logical unit is different from the second logical unit, and the first logical unit and the second logical unit are associated with each other.

32. The memory control circuit unit as claimed in claim 27, wherein the memory management circuit is further configured to:

record first mapping information in a first mapping table, wherein the first mapping information reflects a mapping relationship between the first logical unit and the first physical unit; and record second mapping information in a second mapping table, wherein the second mapping information reflects a mapping relationship between the first logical unit and the second physical unit, and the first mapping table is different from the second mapping table.

33. The memory control circuit unit as claimed in claim 32, wherein the memory management circuit is further configured to:

in response to the third data stored in the third physical unit, updating the first mapping information recorded in the first mapping table, wherein the updated first mapping information reflects a mapping relationship between the first logical unit and the third physical unit.

34. The memory control circuit unit as claimed in claim 27, wherein the memory control circuit unit is further configured to:

disallow to read the third physical unit before the target calculation is completed to obtain the third data.

35. The memory control circuit unit as claimed in claim 27, wherein the memory management circuit is further configured to:

determine whether to activate the first operation mode based on the first logical unit to which the first data belongs.

36. The memory control circuit unit as claimed in claim 27, wherein the target calculation is configured to support an artificial intelligence model in the host system to update data.

37. The memory control circuit unit as claimed in claim 27, wherein the memory management circuit is further configured to:

receive a write command from the host system, wherein the write command is configured to write the first data into the first logical unit;

receive a read command from the host system, wherein the read command is configured to read the first logical unit; and transmit the third data to the host system in response to the read command.

38. The memory control circuit unit as claimed in claim 27, wherein the memory management circuit is further configured to:

perform a handshake operation with the host system before performing the target calculation; and perform initialization settings associated with the target calculation during the handshake operation.

39. The memory control circuit unit as claimed in claim 38, wherein the handshake operation comprises:

receive an inquiry command from the host system, wherein the inquiry command is configured to ascertain an ability of the memory control circuit unit to support computation for an artificial intelligence model; and send a reply message to the host system, wherein the reply message is configured to explain the ability of the memory control circuit unit to support the computation for the artificial intelligence model.

* * * * *